(12) United States Patent
Dai (10) Patent No.: US 12,307,713 B2
(45) Date of Patent: May 20, 2025

(54) CAMERA CALIBRATION METHOD AND APPARATUS AND ELECTRONIC DEVICE

(71) Applicant: AUTEL ROBOTICS CO., LTD., Guangdong (CN)

(72) Inventor: Zhenyou Dai, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 686 days.

(21) Appl. No.: 17/456,924

(22) Filed: Nov. 30, 2021

(65) Prior Publication Data

US 2022/0084246 A1 Mar. 17, 2022

Related U.S. Application Data

(63) Continuation of application No. PCT/CN2020/093433, filed on May 29, 2020.

(30) Foreign Application Priority Data

May 31, 2019 (CN) .......................... 201910470300.9

(51) Int. Cl.
*G06T 7/80* (2017.01)
*G06T 3/60* (2024.01)
(Continued)

(52) U.S. Cl.
CPC .................. *G06T 7/80* (2017.01); *G06T 3/60* (2013.01); *G06T 7/73* (2017.01); *H04N 17/002* (2013.01);
(Continued)

(58) Field of Classification Search
CPC .... G06T 7/80; G06T 3/60; G06T 7/73; G06T 2207/10032; G06T 2207/30244; G06T 2207/30208; H04N 17/002
See application file for complete search history.

(56) References Cited

U.S. PATENT DOCUMENTS

2010/0134688 A1* 6/2010 Moriwake ............. G06T 15/506
345/426
2012/0287240 A1* 11/2012 Grossmann ............... G06T 7/80
348/46
(Continued)

FOREIGN PATENT DOCUMENTS

CN 101673397 B 4/2012
CN 103353388 A 10/2013
(Continued)

OTHER PUBLICATIONS

The International Search Report mailed Aug. 28, 2020; PCT/CN2020/093433.
(Continued)

*Primary Examiner* — Molly Wilburn (57) ABSTRACT

Embodiments of the present invention relate to the field of unmanned aerial vehicle (UAV) technologies, and in particular, to a camera calibration method and apparatus and an electronic device. The method includes: obtaining a calibration image acquired by a camera on a calibration object, where the calibration object includes at least two basic units, and each basic unit has a different pattern; extracting feature points from the basic units of the calibration image, and obtaining pixel coordinates of the feature points; obtaining world coordinates of the feature points; and performing camera calibration according to the pixel coordinates and the world coordinates of the feature points.

8 Claims, 4 Drawing Sheets

(51) Int. Cl.
  *G06T 7/73* (2017.01)
  *H04N 17/00* (2006.01)
(52) U.S. Cl.
  CPC .............. *G06T 2207/10032* (2013.01); *G06T 2207/30244* (2013.01)

(56) References Cited

U.S. PATENT DOCUMENTS

| | | | |
|---|---|---|---|
| 2012/0287287 A1* | 11/2012 | Grossmann | H04N 17/002 348/181 |
| 2017/0221226 A1* | 8/2017 | Shen | G06T 7/80 |
| 2017/0243374 A1* | 8/2017 | Matsuzawa | H04N 17/002 |
| 2019/0073795 A1* | 3/2019 | Matsuzawa | G06T 7/80 |
| 2019/0295291 A1* | 9/2019 | Raag | G06T 7/85 |

FOREIGN PATENT DOCUMENTS

| | | |
|---|---|---|
| CN | 103597825 A | 2/2014 |
| CN | 104408704 A | 3/2015 |
| CN | 104853180 A | 8/2015 |
| CN | 206441238 U | 8/2017 |
| CN | 108072319 A | 5/2018 |
| CN | 108550171 A | 9/2018 |
| CN | 110232716 A | 9/2019 |

OTHER PUBLICATIONS

"Precision and Error Analysis of LCD-Based Camera Calibration Method" Nov. 30, 2008; Geomatics and Information Science of Wuhan University; vol. 33, No. 11; 5 pages.

* cited by examiner

CAMERA CALIBRATION METHOD AND APPARATUS AND ELECTRONIC DEVICE

CROSS-REFERENCE TO RELATED APPLICATIONS

The present application is a continuation of International Application No. PCT/CN2020/092645, filed on May 27, 2020, which claims priority to Chinese Patent Application No. 201910470300.9, filed on May 31, 2019, which is incorporated herein by reference in its entirety.

TECHNICAL FIELD

The present application relates to the field of unmanned aerial vehicle (UAV) technologies, and in particular, to a camera calibration method and apparatus and an electronic device.

BACKGROUND

Camera calibration is a basic problem of machine vision. A monocular camera may have errors due to production and processing and characteristics of the camera. Errors may also occur in a process of assembling of a binocular camera or a multi-lens camera. Such errors have a negative impact on a vision measurement algorithm. Therefore, camera calibration needs to be performed before vision measurement. Correct calibration is required to ensure the accuracy of subsequent measurement work.

Usually, an objective of camera calibration is to establish a relationship between pixel positions in an image of a camera and a spatial position of an object, that is, a relationship between a world coordinate system and an image coordinate system. In a camera calibration method, model parameters of a camera are usually solved from pixel coordinates and world coordinates of known feature points according to a model of the camera. For example, the parameters to be solved include an internal parameter, a distortion parameter, an external parameter, a rotation matrix, and a translation vector.

The camera calibration method includes a calibration method based on a calibration object and a self-calibration method based on an image sequence. In the calibration method based on a calibration object, parameters of the camera are solved by using a relationship between feature points on a calibration object and points on an image that correspond to the feature points, to complete calibration.

During implementation of the present invention, the inventor finds at least the following problems in the related art:

In the calibration method based on a calibration object, a precision-machined planar checkerboard is usually used as a calibration object. Patterns of all parts in the planar checkerboard are the same. Therefore, when the camera acquires an image based on the calibration object, each acquired image needs to include the entire calibration object, so that a position at which a feature point in the image is located is determined and then world coordinates of the feature point are determined. The calibration method is complex.

SUMMARY

An objective of embodiments of the present invention is to provide a simple camera calibration method and apparatus and an electronic device.

According to a first aspect, an embodiment of the present invention provides a camera calibration method, applicable to an electronic device, the method including:
    obtaining a calibration image acquired by a camera on a calibration object, where the calibration object includes at least two basic units, and each basic unit has a different pattern;
    extracting feature points from the basic units of the calibration image, and obtaining pixel coordinates of the feature points;
    obtaining world coordinates of the feature points; and
    performing camera calibration according to the pixel coordinates and the world coordinates of the feature points.

In some embodiments, the method further includes:
    displaying the calibration object on a display screen of the electronic device.

In some embodiments, the method further includes:
    displaying an image acquisition position on the calibration object, where the image acquisition position is configured to guide the camera to acquire the calibration image; and
    the obtaining a calibration image acquired by a camera on a calibration object includes:
    obtaining the calibration image acquired by the camera according to the image acquisition position.

In some embodiments, the obtaining the calibration image acquired by the camera according to the image acquisition position includes:
    obtaining a position of an intersection of an optical axis of the camera and a plane in which the display screen is located; and
    obtaining an image acquired by the camera when the position of the intersection matches the image acquisition position as the calibration image of the image acquisition position.

In some embodiments, the displaying an image acquisition position on the calibration object includes:
    displaying the image acquisition position on the calibration object, and sequentially displaying a next image acquisition position after the electronic device obtains the calibration image of the image acquisition position.

In some embodiments, the obtaining a calibration image acquired by a camera on a calibration object includes:
    obtaining a calibration image acquired by the camera on the calibration object at a first distance from the calibration object; and
    obtaining a calibration image acquired by the camera on the calibration object at a second distance from the calibration object.

In some embodiments, the obtaining a position of an intersection of an optical axis of the camera and a plane in which the display screen is located includes:
    obtaining an initial calibration image acquired by the camera on the calibration object;
    performing camera calibration according to the initial calibration image, to obtain an initial rotation matrix R and an initial translation vector t of a world coordinate system relative to a camera coordinate system; and
    obtaining, according to the initial rotation matrix R and the initial translation vector t, the position of the intersection of the optical axis of the camera and the plane in which the display screen is located.

In some embodiments, the displaying the image acquisition position on the calibration object, and sequentially displaying a next image acquisition position after the electronic device obtains the calibration image of the image acquisition position includes:

sequentially displaying image acquisition positions at the center and periphery of the calibration object.

According to a second aspect, an embodiment of the present invention provides a camera calibration apparatus, applicable to an electronic device, and including:

a calibration image obtaining module, configured to obtain a calibration image acquired by a camera on a calibration object, where the calibration object includes at least two basic units, and each basic unit has a different pattern; a feature point extraction and pixel coordinate obtaining module, configured to: extract feature points from the basic units of the calibration image, and obtain pixel coordinates of the feature points;

a world coordinate obtaining module, configured to obtain world coordinates of the feature points; and a camera calibration module, configured to perform camera calibration according to the pixel coordinates and the world coordinates of the feature points.

In some embodiments, the apparatus further includes:

a display module, configured to display the calibration object on a display screen of the electronic device.

In some embodiments, the display module is further configured to display an image acquisition position on the calibration object, where the image acquisition position is configured to guide the camera to acquire the calibration image;

and the calibration image obtaining module is further configured to:

obtain the calibration image acquired by the camera according to the image acquisition position.

In some embodiments, the calibration image obtaining module is further configured to:

obtain a position of an intersection of an optical axis of the camera and a plane in which the display screen is located; and obtain an image acquired by the camera when the position of the intersection matches the image acquisition position as the calibration image of the image acquisition position.

In some embodiments, the display module is further configured to:

display the image acquisition position on the calibration object, and sequentially display a next image acquisition position after the electronic device obtains the calibration image of the image acquisition position.

In some embodiments, the calibration image obtaining module is further configured to:

obtain a calibration image acquired by the camera on the calibration object at a first distance from the calibration object; and obtain a calibration image acquired by the camera on the calibration object at a second distance from the calibration object.

In some embodiments, the calibration image obtaining module is further configured to:

obtain an initial calibration image acquired by the camera on the calibration object;

perform camera calibration according to the initial calibration image, to obtain an initial rotation matrix R and an initial translation vector t of a world coordinate system relative to a camera coordinate system; and obtain, according to the initial rotation matrix R and the initial translation vector t, the position of the intersection of the optical axis of the camera and the plane in which the display screen is located.

In some embodiments, the display module is further configured to:

sequentially display image acquisition positions at the center and periphery of the calibration object.

According to a third aspect, an embodiment of the present invention provides an electronic device, including:

at least one processor; and a memory communicatively connected to the at least one processor, where the memory stores instructions executable by the at least one processor, and the instructions are executed by the at least one processor to cause the at least one processor to perform the foregoing method.

According to a fourth aspect, an embodiment of the present invention provides a non-volatile computer-readable storage medium, where the computer-readable storage medium stores computer-executable instructions, the computer-executable instructions, when executed by an electronic device, causing the electronic device to perform the foregoing method.

According to a fifth aspect, an embodiment of the present application further provides a computer program product, including a computer program stored in a non-volatile computer-readable storage medium, the computer program including program instructions, the program instructions, when executed by an electronic device, causing the electronic device to perform the foregoing method.

For the camera calibration method and apparatus and the electronic device in the embodiments of the present invention, because basic units in a calibration object have different patterns, world coordinates of feature points may be determined according to basic units in which the feature points are located, to perform camera calibration according to pixel coordinates corresponding to the feature points and the world coordinates. An image acquired by a camera does not need to include the entire calibration object, and the calibration method is simple.

BRIEF DESCRIPTION OF THE DRAWINGS

One or more embodiments are exemplarily described with reference to the corresponding figures in the accompanying drawings, and the descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the embodiments of the present invention without creative efforts shall fall within the protection scope of the present invention.

Figure 1:
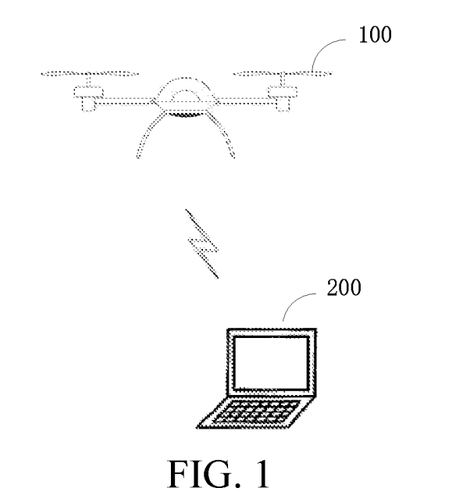
FIG. 1 is a schematic diagram of an application scenario of a camera calibration method and apparatus according to an embodiment of the present invention.

FIG. 1 shows an application scenario of a camera calibration method and apparatus according to an embodiment of the present invention. The application scenario includes a UAV 100 and an electronic device 200. The UAV 100 may be an appropriate UAV, including a fixed-wing UAV and a rotary-wing UAV, such as a helicopter, a quadrotor and an aircraft with another quantity of rotors and/or rotor configuration. The UAV 100 may be another movable object such as a manned aircraft, a model airplane, an unmanned airship and an unmanned hot air balloon. The electronic device 200 is, for example, a smartphone, a tablet computer, a computer or a remote control. A user may interact with the electronic device 200 through one or more user interaction devices of any appropriate type, and the user interaction device may be a mouse, a button, a touch screen and the like. A communication connection may be established between the UAV 100 and the electronic device 200 by using wireless communication modules (for example, a signal receiver and a signal transmitter) respectively disposed in the UAV and the electronic device for uploading or delivering data/instructions.

In some embodiments, the UAV 100 includes a body, an arm connected to the body, and a power system disposed on the arm. The power system is configured to provide thrust, lift or the like for the UAV 100 to fly. The UAV 100 further includes a camera and a controller. The camera is electrically connected to the controller. The camera is configured to photograph an image of a target position or a surrounding environment of the UAV. The controller is configured to obtain the target position, a map of the surrounding environment of the UAV or the like according to the image. The camera may be a high-resolution digital camera or another camera apparatus. The camera may be disposed at any appropriate position for photographing. In some embodiments, the camera is mounted at the bottom of the body of the UAV by using a gimbal. In some other embodiments, the camera is disposed on a front portion and/or a lower portion of the body. There may be one or more cameras. This is not limited in the embodiments of the present invention.

The foregoing camera needs to be calibrated before use. An objective of camera calibration is to obtain internal and external parameter matrices and perform distortion correction, and the like. In some applications, the objective is mainly to obtain a rotation matrix R and a translation vector t of a world coordinate system to a camera coordinate system, and an internal parameter matrix C of the camera coordinate system to an ideal screen coordinate system. If X represents the world coordinate system, X' represents the camera coordinate system and L represents the screen coordinate system, X'=[R|t] *X, and L=C*[R|t] *X. In this case, coordinates of several feature points of a calibration object in the world coordinate system are obtained, and then corresponding coordinates of the several feature points in the screen coordinate system are obtained in an image of the calibration object captured by the camera. That is, world coordinates and screen coordinates of the several feature points are known, initial values of parameters may be obtained by solving linear equations, and then optimal solutions are obtained by using an iterative nonlinear least square method.

Figure 2:
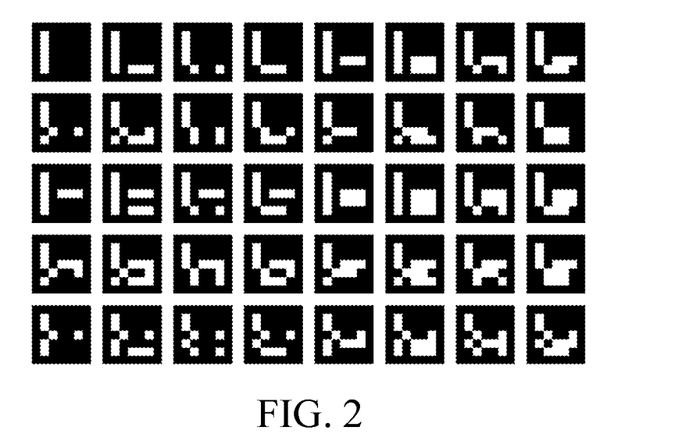
FIG. 2 is a schematic diagram of a calibration object according to an embodiment of the present invention.

In this embodiment of the present invention, the electronic device 200 displays the calibration object. The camera of the UAV 100 then acquires a calibration image on the calibration object. Feature points in the calibration image and pixel coordinates of the feature points are obtained. The camera is calibrated according to the pixel coordinates and world coordinates of the feature points. The calibration object includes at least two basic units, and each basic unit has a different pattern. FIG. 2 shows a style of the calibration object. Each basic unit has a different pattern. Therefore, even though the camera of the UAV 100 only photographs a small part of a pattern of the calibration object, basic units can be determined according to styles of the basic units, so that world coordinates of feature points on the basic units can be obtained. Points with obvious features such as corner points of the basic units may be selected as the feature points in the calibration object. World coordinates of the corner points may be stored in the electronic device 200 in advance. In some other embodiments, the calibration object may be made into a special calibration object for camera calibration.

It should be noted that, the camera calibration method in the embodiments of the present invention may be applied to monocular camera calibration or binocular camera calibration. In addition to the UAV 100, the camera calibration method in the embodiments of the present invention may be applied to camera calibration of another apparatus, for example, a camera of a robot.

Figure 3:
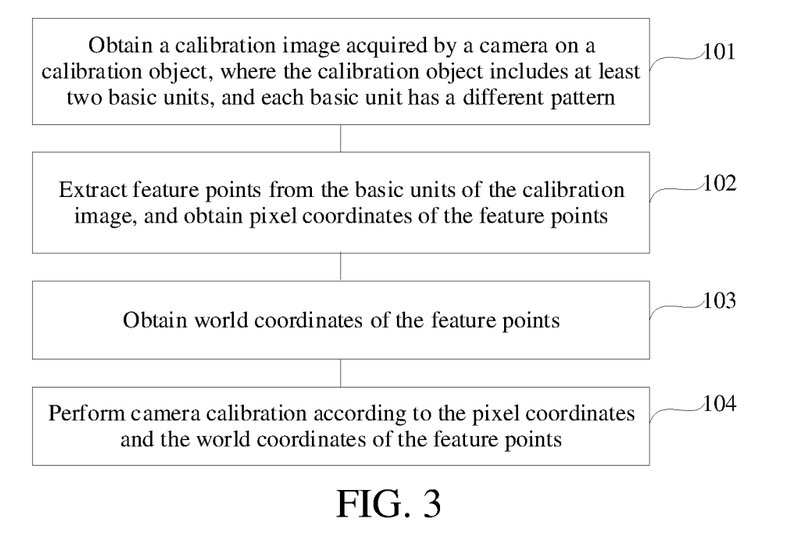
FIG. 3 is a schematic flowchart of an embodiment of a camera calibration method according to the present invention.

FIG. 3 is a schematic flowchart of a camera calibration method according to an embodiment of the present invention. The method may be performed by the electronic device 200 in FIG. 1. As shown in FIG. 3, the method includes the following steps:

101: Obtain a calibration image acquired by a camera on a calibration object, where the calibration object includes at least two basic units, and each basic unit has a different pattern.

In some embodiments, the calibration object may be made into a special calibration object for camera calibration. In some other embodiments, the calibration object may be displayed on a display screen of the electronic device 200 to reduce costs.

Optionally, when the calibration object is displayed on the display screen of the electronic device 200, an image acquisition position may be displayed on the electronic device, to guide or lead the completion of calibration. The image acquisition position is configured to guide the camera to acquire the calibration image. When the camera acquires the calibration image, an optical axis of the camera is moved as close as possible to the image acquisition position. The setting of the image acquisition position makes a calibration process of the camera easier to operate. Image acquisition positions may be selected to cover the entire calibration object as much as possible, to make the calibration more accurate. For example, marks shown in FIG. 4 may be used as the image acquisition positions. The image acquisition positions in FIG. 4 basically cover the center and surrounding areas of the calibration object, so that a coverage range is wide and the accuracy of the camera calibration can be improved. In actual applications, a background color of the marks may use a bright color such as red. In some other embodiments, the image acquisition position may be located at any appropriate position in the calibration object.

Figure 4:
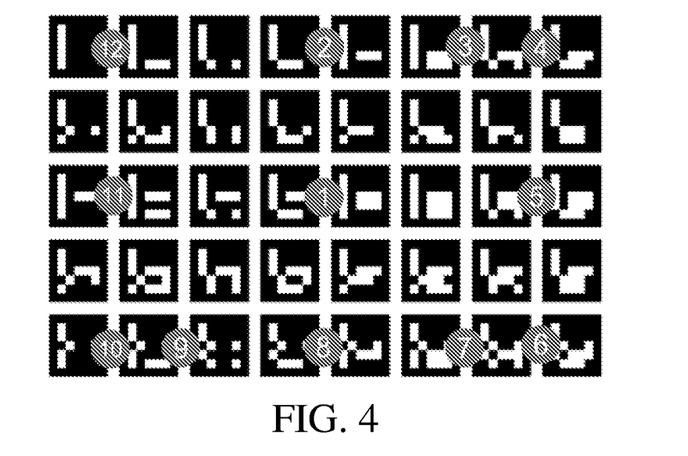
FIG. 4 is a schematic diagram of a calibration object and an image acquisition position according to an embodiment of the present invention.

In some of the embodiments, to further improve the accuracy of camera calibration, when the camera acquires the calibration image, the optical axis of the camera should be aligned with the image acquisition position as much as possible. That is, a position of an intersection of the optical axis of the camera and the display screen of the electronic device should match the image acquisition position as much as possible. When the position of the intersection is used to match the image acquisition position, an image acquired by the camera is used as the calibration image. The calibration image is used to perform the camera calibration, so that the camera calibration is more accurate. The matching means that the position of the intersection is located at the image acquisition position, or the position of the intersection and the image acquisition position satisfy a specific error requirement.

During actual applications, the user may hold the camera to align the optical axis of the camera with the image acquisition position. In other scenarios such as a scenario that the calibration method is applied to a UAV, the UAV may autonomously align the optical axis of the camera with the image acquisition position. In a process of aligning the optical axis of the camera with the image acquisition position, the camera continuously obtains images and send the images to the electronic device. The electronic device calculates a position of an intersection of the optical axis of the camera and a plane in which the display screen is located in real time. When the position of the intersection matches the image acquisition position, an image sent by the camera at this time is obtained as the calibration image of the image acquisition position.

Specifically, in some of the embodiments, the camera may first acquire an initial calibration image on the calibration object, to obtain an initial rotation matrix R and an initial translation vector t of a world coordinate system relative to a camera coordinate system, and then obtain, by using the initial rotation matrix R and the initial translation vector t, the position of the intersection of the optical axis of the camera and the plane in which the display screen is located. For example, Pworld=$R^{-1}$*Pcam$R^{-1}$*t is obtained from Pcam=Pworld*R+t, where Pcam represents coordinates in the camera coordinate system, and Pworld represents coordinates in the world coordinate system. As a result, it may be obtained that, a coordinate of the origin of the camera coordinate system in the world coordinate system is $t^0 = -R^{-1}$*t.

An equation may be obtained according to the intersection of the optical axis and the screen:

$$\begin{bmatrix} t_x^0 \\ t_y^0 \\ t_z^0 \end{bmatrix} + \alpha \begin{bmatrix} R_{02}^{-1} \\ R_{12}^{-1} \\ R_{22}^{-1} \end{bmatrix} = \begin{bmatrix} x \\ y \\ 0 \end{bmatrix}.$$

A third column of $R^{-1}$ or a third row of $R^{-1}$, and the same result is obtained. The coordinate $t^0(t_x^0, t_y^0, t_z^0)$ of the origin of the camera coordinate system in the world coordinate system is known. Therefore, coordinates x and y of the intersection of the optical axis and the screen may be obtained by solving the above equation.

Generally, there are a plurality of image acquisition positions. In some embodiments, all image acquisition positions may be displayed at once. In some other embodiments, the plurality of image acquisition positions may be displayed sequentially. After displaying an image acquisition position and obtains a calibration image of the image acquisition position, the electronic device may sequentially display a next image acquisition position. For example, the electronic device may sequentially display the image acquisition positions from the center of the calibration object to the periphery of the calibration object, or sequentially display the image acquisition positions from the periphery of the calibration object to the center of the calibration object. Still using FIG. 4 as an example, the electronic device may first display an image acquisition position 1, display an image acquisition position 2 after obtaining a calibration image at the image acquisition position 1, and display an image acquisition position 3 after obtaining a calibration image at the image acquisition position 2, and so on, until an image acquisition position 12 is displayed and a calibration image at the image acquisition position 12 is obtained. In this way, 12 calibration images are obtained.

In some other embodiments, to increase the diversity of samples and further improve the calibration accuracy, calibration images may be separately obtained at different distances from the camera to the display screen. For example, a set of calibration images are obtained at a first distance from the camera to the display screen (that is, the calibration object), and a set of calibration images are obtained at a second distance from the camera to the display screen. In other embodiments, more sets of calibration images may be obtained. The first distance is, for example, 1 m from the display screen. The second distance is, for example, 2 m from the display screen. If the calibration object shown in FIG. 4 is used, a total of 24 calibration images may be obtained.

102: Extract feature points from the basic units of the calibration image, and obtain pixel coordinates of the feature points.

The feature points may be points with obvious features in the calibration object, for example, corner points of the basic units in the embodiment of FIG. 4.

103: Obtain world coordinates of the feature points.

The world coordinates of the feature points on the basic units in the calibration object may be stored in the electronic device in advance. As long as the basic units are determined, the world coordinates of the feature points on the basic units can be obtained. Because basic units in a calibration object have different patterns, it is easy to determine a basic unit based on pattern comparison. Using the embodiment shown in FIG. 4 as an example, four corner points of basic units in FIG. 4 may be selected as feature points. 40 basic units have a total of 160 feature points. The patterns of the basic units and world coordinates of the corner points of the basic units may be stored in the electronic device in advance. If the camera only obtains part of patterns at a lower left corner, because each basic unit has a unique pattern, corresponding world coordinates may be obtained by comparing the patterns in the calibration image with the patterns stored in the electronic device.

104: Perform camera calibration according to the pixel coordinates and the world coordinates of the feature points.

After the pixel coordinates and the world coordinates of the feature points are obtained, the camera calibration may be performed by using a current calibration method. For example, the camera calibration is performed by using a perspective-n-point (PnP) algorithm.

In the embodiments of the present invention, because basic units in a calibration object have different patterns, world coordinates of feature points may be determined according to basic units in which the feature points are located, to perform camera calibration according to pixel coordinates corresponding to the feature points and the world coordinates. An image acquired by a camera does not need to include the entire calibration object, and the calibration method is simple.

Figure 5:
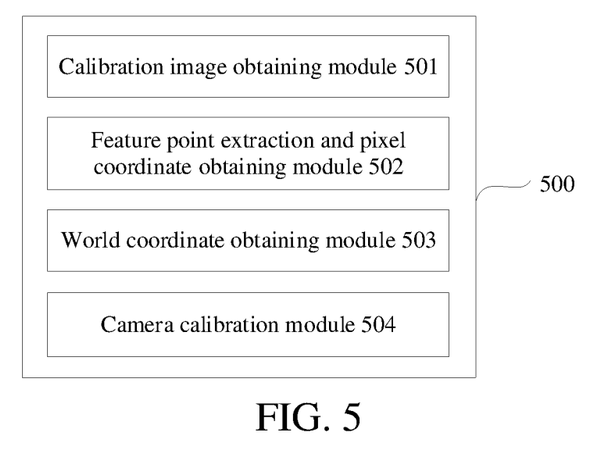
FIG. 5 is a schematic structural diagram of an embodiment of a camera calibration apparatus according to the present invention.

Correspondingly, as shown in FIG. 5, an embodiment of the present invention further provides a camera calibration apparatus, applicable to an electronic device. The apparatus includes:

a calibration image obtaining module 501, configured to obtain a calibration image acquired by a camera on a calibration object, where the calibration object includes at least two basic units, and each basic unit has a different pattern;

a feature point extraction and pixel coordinate obtaining module 502, configured to: extract feature points from the basic units of the calibration image, and obtain pixel coordinates of the feature points;

a world coordinate obtaining module 503, configured to obtain world coordinates of the feature points; and a camera calibration module 504, configured to perform camera calibration according to the pixel coordinates and the world coordinates of the feature points.

In the embodiments of the present invention, because basic units in a calibration object have different patterns, world coordinates of feature points may be determined according to basic units in which the feature points are located, to perform camera calibration according to pixel coordinates corresponding to the feature points and the world coordinates. An image acquired by a camera does not need to include the entire calibration object, and the calibration method is simple.

Figure 6:
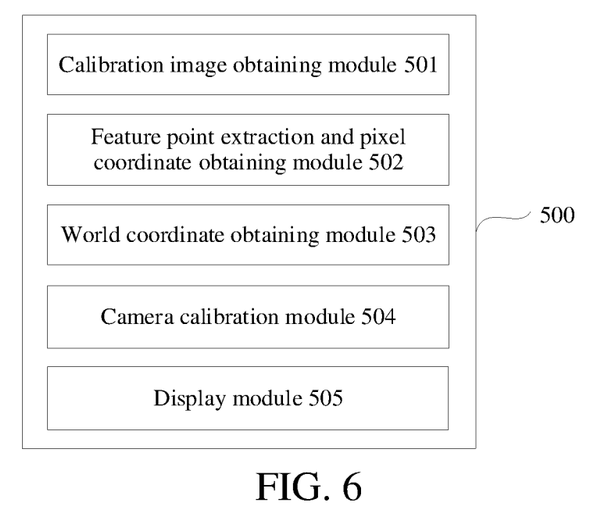
FIG. 6 is a schematic structural diagram of an embodiment of a camera calibration apparatus according to the present invention.

In some of the embodiments, as shown in FIG. 6, the apparatus further includes:

a display module 505, configured to display the calibration object on a display screen of the electronic device.

In some of the embodiments, the display module 505 is further configured to display an image acquisition position on the calibration object, where the image acquisition position is configured to guide the camera to acquire the calibration image; and the calibration image obtaining module 501 is further configured to:

obtain the calibration image acquired by the camera according to the image acquisition position.

In some of the embodiments, the calibration image obtaining module 501 is further configured to:

obtain a position of an intersection of an optical axis of the camera and a plane in which the display screen is located; and obtain an image acquired by the camera when the position of the intersection matches the image acquisition position as the calibration image of the image acquisition position.

In some of the embodiments, the display module 505 is further configured to:

display the image acquisition position on the calibration object, and sequentially display a next image acquisition position after the electronic device obtains the calibration image of the image acquisition position.

In some of the embodiments, the calibration image obtaining module 501 is further configured to:

obtain a calibration image acquired by the camera on the calibration object at a first distance from the calibration object; and obtain a calibration image acquired by the camera on the calibration object at a second distance from the calibration object.

In some of the embodiments, the calibration image obtaining module 501 is further configured to:

obtain an initial calibration image acquired by the camera on the calibration object;

perform camera calibration according to the initial calibration image, to obtain an initial rotation matrix R and an initial translation vector t of a world coordinate system relative to a camera coordinate system; and obtain, according to the initial rotation matrix R and the initial translation vector t, the position of the intersection of the optical axis of the camera and the plane in which the display screen is located.

In some of the embodiments, the display module 505 is further configured to:

sequentially display image acquisition positions at the center and periphery of the calibration object.

The foregoing product may perform the method provided in the embodiments of the present application, and have the corresponding functional modules for performing the method and beneficial effects thereof. For technical details not described in detail in this embodiment, refer to the method provided in the embodiments of the present application.

Figure 7:
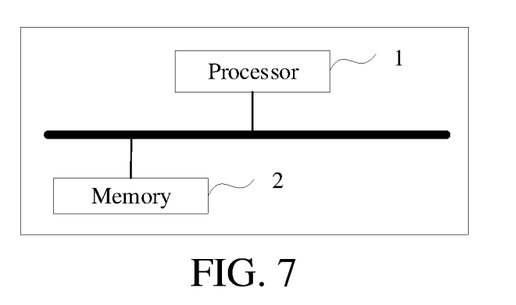
FIG. 7 is a schematic structural diagram of hardware of an embodiment of an electronic device according to the present invention.

FIG. 7 is a schematic structural diagram of hardware of an electronic device 200. Referring to FIG. 7, the electronic device 200 includes:

one or more processors 1 and a memory 2. One processor 1 is used as an example in FIG. 7.

The processor 1 and the memory 2 may be connected by a bus or in other manners and are, for example, connected by a bus in FIG. 7.

The memory 2, as a non-volatile computer-readable storage medium, may be configured to store a non-volatile software program, a non-volatile computer-executable program and a module, such as program instructions/modules (for example, the calibration image obtaining module 501, the feature point extraction and pixel coordinate obtaining module 502, the world coordinate obtaining module 503 and the camera calibration module 504 shown in FIG. 5) corresponding to the camera calibration method in the embodiments of the present application. The processor 1 performs various functional applications and data processing of the electronic device by running the non-volatile software program, instructions and module stored in the memory 2, that is, implementing the camera calibration method provided in the foregoing method embodiments.

The memory 2 may include a program storage area and a data storage area. The program storage area may store an operating system and an application program that is required for at least one function. The data storage area may store data created according to use of a controller. In addition, the memory 2 may include a high-speed random-access memory (RAM), and may also include a non-volatile memory, such as at least one magnetic disk storage device, a flash memory, or another non-volatile solid-state storage device. In some embodiments, the memory 2 may optionally include memories remotely disposed relative to the processor 1, and these remote memories may be connected to the electronic device through a network. Examples of the network include, but are not limited to, the Internet, an intranet, a local area network, a mobile communication network and a combination thereof.

The one or more modules are stored in the memory 2, and when executed by the one or more processors 1, perform the camera calibration method in any of the foregoing method embodiments. For example, perform the foregoing described method steps 101 to 104 in FIG. 3; and implement the functions of the modules 501 to 504 in FIG. 5 and the modules 501 to 505 in FIG. 6.

The foregoing product may perform the method provided in the embodiments of the present application, and have the corresponding functional modules for performing the method and beneficial effects thereof. For technical details not described in detail in this embodiment, refer to the method provided in the embodiments of the present application.

The embodiments of the present application further provide a non-volatile computer-readable storage medium, storing computer executable instructions. The computer executable instructions are executed by one or more processors, for example, one processor 1 in FIG. 7, so that the foregoing one or more processors may perform the camera calibration method in any of the foregoing method embodiments, for example, perform the foregoing described method steps 101 to 104 in FIG. 3; and implement the functions of the modules 501 to 504 in FIG. 5 and the modules 501 to 505 in FIG. 6.

The foregoing described apparatus embodiments are merely examples. The units described as separate parts may or may not be physically separate, and the parts displayed as units may or may not be physical units, may be located in one position, or may be distributed on a plurality of network units. Some or all of the modules may be selected according to actual needs to achieve the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that, all or some of the processes of the method in the foregoing embodiments may be implemented by a computer program instructing relevant hardware. The program may be stored in a computer-readable storage medium. During execution of the program, the processes of the foregoing method embodiments may be included. The foregoing storage medium may be a magnetic disk, an optical disc, a read-only memory (ROM), a RAM, or the like.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above, and these changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions, and these modifications or replacements will not cause the essence of corresponding technical solutions to depart from the scope of the technical solutions in the embodiments of the present invention.

What is claimed is:

1. A camera calibration method, applicable to electronic device, and comprising:
    obtaining a calibration image acquired by a camera on a calibration object, wherein the calibration object comprises at least two basic units, and each basic unit has a different pattern;
    extracting feature points from the basic units of the calibration image, and obtaining pixel coordinates of the feature points;
    obtaining world coordinates of the feature points;
    performing camera calibration according to the pixel coordinates and the world coordinates of the feature points
    displaying the calibration object on a display screen of the electronic device;
    displaying an image acquisition position on the calibration object,
    wherein
        the image acquisition position is configured to guide the camera to acquire the calibration image;
        the obtaining a calibration image acquired by a camera on a calibration object includes obtaining the calibration image acquired by the camera according to the image acquisition position,
    wherein
        the obtaining the calibration image acquired by the camera according to the image acquisition position includes obtaining a position of an intersection of an optical axis of the camera and a plane in which the display screen is located, and
        obtaining an image acquired by the camera when the position of the intersection matches the image acquisition position as the calibration image of the image acquisition position; and
    the displaying an image acquisition position on the calibration object includes displaying the image acquisition position on the calibration object, and sequentially displaying a next image acquisition position after the electronic device obtains the calibration image of the image acquisition position.

2. The method according to claim 1, wherein the obtaining a calibration image acquired by a camera on a calibration object comprises:
    obtaining a calibration image acquired by the camera on the calibration object at a first distance from the calibration object; and
    obtaining a calibration image acquired by the camera on the calibration object at a second distance from the calibration object.

3. The method according to claim 1, wherein the obtaining a position of an intersection of an optical axis of the camera and a plane in which the display screen is located comprises:
    obtaining an initial calibration image acquired by the camera on the calibration object;
    performing camera calibration according to the initial calibration image, to obtain an initial rotation matrix R and an initial translation vector t of a world coordinate system relative to a camera coordinate system; and
    obtaining, according to the initial rotation matrix R and the initial translation vector t, the position of the intersection of the optical axis of the camera and the plane in which the display screen is located.

4. The method according to claim 1, wherein the displaying the image acquisition position on the calibration object, and sequentially displaying a next image acquisition position after the electronic device obtains the calibration image of the image acquisition position comprises:

sequentially displaying image acquisition positions at the center and periphery of the calibration object.

5. A camera calibration apparatus, applicable to electronic device, wherein the apparatus comprises:

at least one processor; and a memory communicatively connected to the at least one processor, wherein the memory stores instructions executable by the at least one processor, and the instructions are executed by the at least one processor to cause the at least one processor to perform the following steps:

obtaining a calibration image acquired by a camera on a calibration object, wherein the calibration object comprises at least two basic units, and each basic unit has a different pattern;

extracting feature points from the basic units of the calibration image, and obtaining pixel coordinates of the feature points;

obtaining world coordinates of the feature points; and performing camera calibration according to the pixel coordinates and the world coordinates of the feature points;

wherein the processor is further configured to:

display the calibration object on a display screen of the electronic device;

display an image acquisition position on the calibration object, wherein the image acquisition position is configured to guide the camera to acquire the calibration image;

obtain the calibration image acquired by the camera according to the image acquisition position;

obtain a position of an intersection of an optical axis of the camera and a plane in which the display screen is located;

obtain an image acquired by the camera when the position of the intersection matches the image acquisition position as the calibration image of the image acquisition position; and display the image acquisition position on the calibration object, and sequentially display a next image acquisition position after the electronic device obtains the calibration image of the image acquisition position.

6. The apparatus according to claim 5, wherein the processor is further configured to:

obtain a calibration image acquired by the camera on the calibration object at a first distance from the calibration object; and obtain a calibration image acquired by the camera on the calibration object at a second distance from the calibration object.

7. The apparatus according to claim 5, wherein the processor is further configured to:

obtain an initial calibration image acquired by the camera on the calibration object;

perform camera calibration according to the initial calibration image, to obtain an initial rotation matrix R and an initial translation vector t of a world coordinate system relative to a camera coordinate system; and obtain, according to the initial rotation matrix R and the initial translation vector t, the position of the intersection of the optical axis of the camera and the plane in which the display screen is located.

8. The apparatus according to claim 5, wherein the processor is further configured to:

sequentially display image acquisition positions at the center and periphery of the calibration object.

* * * * *